Oct. 15, 1929.   O. K. LANDIS   1,732,054
CABLE FASTENING DEVICE
Filed Oct. 26, 1927
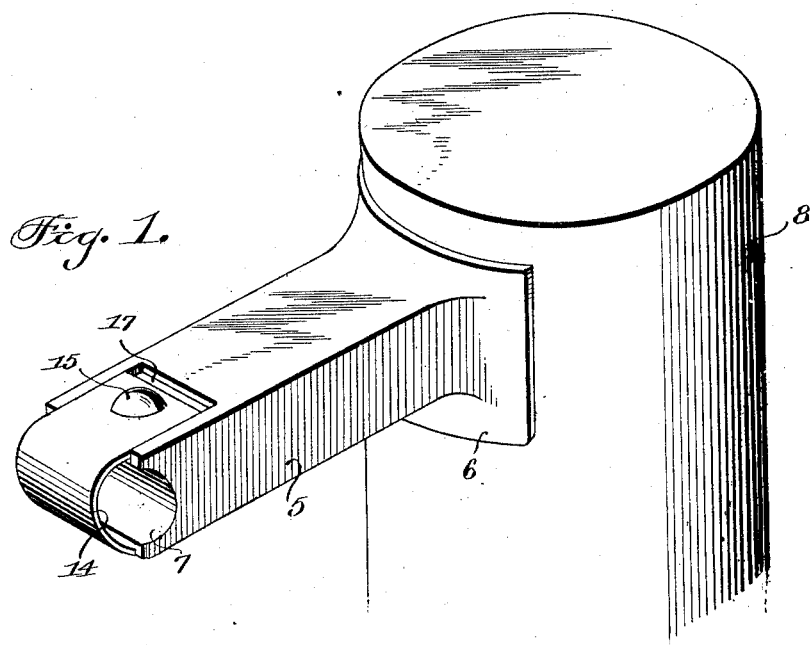
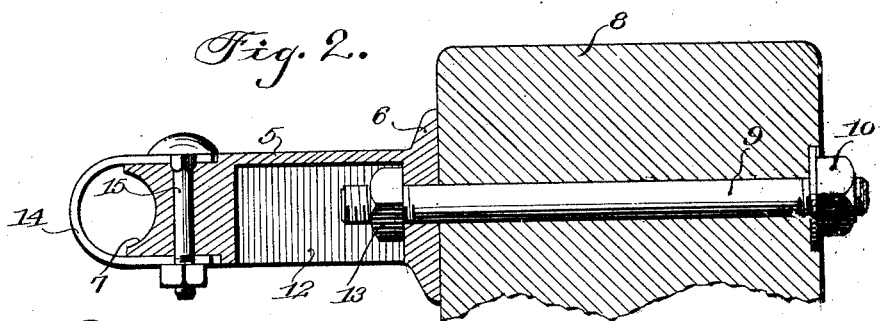
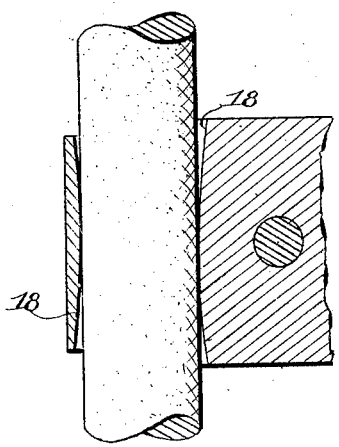
INVENTOR
OMAR K. LANDIS
BY
ATTORNEY Patented Oct. 15, 1929

1,732,054

UNITED STATES PATENT OFFICE

OMAR K. LANDIS, OF LANCASTER, PENNSYLVANIA

CABLE-FASTENING DEVICE

Application filed October 26, 1927. Serial No. 228,953.

My invention relates to fastenings for cables or other flexible elements and more particularly to fastenings of the type disclosed in my co-pending application Serial No. 198,817, filed June 14, 1927.

An object of the invention is to generally simplify and refine the construction of the device embraced by the above identified application.

Further the invention provides a device wherein any one of the elements may be replaced in case of breakage thus overcoming the objection of discarding the entire device should it become broken.

With the preceding and other objects and advantages in mind the invention consists in the combination of elements, construction and arrangement of parts and operations to be hereinafter specifically referred to, claimed and illustrated in the accompanying drawing, wherein, Figure 1 is a perspective of the device associated with a post or standard;

Figure 2 is a vertical longitudinal sectional view of the same, and

Figure 3 is a fragmentary horizontal sectional view with a cable engaged therewith.

Referring to the invention in detail a cast metal arm 5 of rectangular configuration in cross section having a semi-circular base plate 6 formed at one end and a transversely extending semi-circular cable seat or groove formed in its forward vertical face, is provided.

The base plate embraces a cylindrical post or standard 8 and in order to secure the device to the former a bolt 9 or shank passing thru the post or standard and engaging the base plate is provided, the outer end of the latter projecting beyond the post and receives a retaining nut 10 thereon.

For the purpose of adapting the device to posts of various thickness the inner end of the bolt is connected with the base plate for longitudinal adjustment. To provide for this adjustability the inner end of the bolt passes thru a central opening 11 in the base plate and into a longitudinally extending recess 12 in the arm and receives a stop nut or adjustable head 13 which after the bolt has been shifted longitudinally to dispose the required length of the same beyond the base plate, is tightened against the latter.

Co-operating with the cable seat or groove in retaining the cable is a U-shaped strap 14 which is received on the outer end of the arm with its crest opposed to the cable seat or groove and its parallel legs engaged by a vertically disposed fastening 15 passing transversely thru the outer end of the arm. A nut 16 is threaded upon the bolt to retain it in position.

In order to prevent lateral shifting of the strap 14, the legs of the latter are accommodated in rectangular recesses 17 in the upper and lower faces thereof, these recesses permitting substantially the entire length of the legs to be snugly received so that the longitudinal edges of the legs engage the parallel walls of the recesses and constitute stops or abutments.

To eliminate sharp edges and hence preclude cutting the cable the base of the cable seat or groove and the inner face and the crest of the strap are rounded longitudinally as indicated at 18.

What is claimed is:—

In a device of the character described an arm for attachment to a support having a concave base plate adapted to embrace a cylindrical post, means for attaching a longitudinal element to the outer end of the arm, the arm being provided with a longitudinal recess in its under face having parallel side walls, a shank loosely passing through the base plate and having one end projecting into the recess, and a nut arranged in the recess and adjustable on the inner end of the shank, and a nut on the outer end of the shank adjustable against the post to draw the first-mentioned nut against the base plate and clamp the latter against the post.

Signed at Lancaster, in the county of Lancaster and State of Pennsylvania, this 22nd day of October A. D. 1927.

OMAR K. LANDIS.